(12) United States Patent
Borelli

(10) Patent No.: US 12,182,073 B2
(45) Date of Patent: Dec. 31, 2024

(54) DATA STORAGE FOR SCALABLE PROCESSING OF LARGE FILES GENERATED BY SCIENTIFIC INSTRUMENTS

(71) Applicant: Thermo Finnigan LLC, San Jose, CA (US)

(72) Inventor: Neal Borelli, San Jose, CA (US)

(73) Assignee: THERMO FINNIGAN LLC, San Jose, CA (US)

( * ) Notice: Subject to any disclaimer, the term of this patent is extended or adjusted under 35 U.S.C. 154(b) by 0 days.

(21) Appl. No.: 18/148,248

(22) Filed: Dec. 29, 2022

(65) Prior Publication Data
US 2024/0220454 A1 Jul. 4, 2024

(51) Int. Cl.
*G06F 16/172* (2019.01)
*G06F 16/16* (2019.01)

(52) U.S. Cl.
CPC .......... *G06F 16/172* (2019.01); *G06F 16/166* (2019.01)

(58) Field of Classification Search
CPC .............................. G06F 16/172; G06F 16/166
See application file for complete search history.

(56) References Cited

U.S. PATENT DOCUMENTS

| | | | | |
|---|---|---|---|---|
| 9,965,483 B2* | 5/2018 | Beaverson | ............ | G06F 16/188 |
| 10,394,715 B2* | 8/2019 | Cheng | .................. | G06F 12/128 |
| 11,677,824 B2* | 6/2023 | Swallow | ............. | G06F 11/1453 |
| | | | | 709/217 |
| 2002/0165911 A1* | 11/2002 | Gabber | ................... | G06F 16/10 |
| | | | | 707/E17.12 |
| 2015/0123825 A1* | 5/2015 | De Corral | ........... | H03M 7/3059 |
| | | | | 250/282 |
| 2018/0121601 A1* | 5/2018 | Hahm | .................... | G16B 50/40 |
| 2020/0387448 A1* | 12/2020 | Thomasson | ........... | G06F 3/0604 |
| 2021/0057090 A1* | 2/2021 | Gao | ........................ | G16H 40/67 |
| 2021/0089452 A1* | 3/2021 | Peng | ................. | G06F 16/24552 |
| 2022/0300321 A1* | 9/2022 | Nawaz | ................... | G06F 16/184 |

OTHER PUBLICATIONS

International Search Report and Written Opinion for Application No. PCT/US2023/086363 dated Apr. 26, 2024 (15 pages).

* cited by examiner

*Primary Examiner* — Angelica Ruiz
(74) *Attorney, Agent, or Firm* — Michael Best & Friedrich LLP

(57) ABSTRACT

Disclosed herein are scientific instrument support systems, as well as related methods, computing devices, and computer-readable media. For example, in some embodiments, a support apparatus for a scientific instrument comprises first, second, and third logics. The first logic is configured to acquire a first data file via detectors of the instrument. The second logic is configured to convert the first data file into a plurality of second data files stored in an object storage. Each of the second files is named using a suitable file naming convention. The third logic is configured to process a request for a data portion of the first data file and to provide the data portion by accessing one or more of a first memory cache, a second memory cache, and the object storage to obtain a corresponding portion of a corresponding one of the second data files identified based on the file naming convention.

20 Claims, 8 Drawing Sheets

| ScanNum | Mass | Intensity | Baseline | Noise | Resolution |
|---|---|---|---|---|---|
| 1 | 70.8759 | 2031.08 | 58.0833 | 1650.94 | 11204 |
| 1 | 74.3928 | 2290.75 | 59.2946 | 1650.9 | 15004 |
| ... | ... | ... | ... | ... | ... |
| 100 | 116.971 | 44340.8 | 1.04785 | 4161.66 | 15804 |
| 100 | 126.966 | 35953.6 | 1.04785 | 4161.66 | 15304 |

FIG. 3

DATA STORAGE FOR SCALABLE PROCESSING OF LARGE FILES GENERATED BY SCIENTIFIC INSTRUMENTS

BACKGROUND

This application relates generally to data storage devices, and more particularly but not exclusively, to data processing and cache management.

Scientific instruments, such as, for example, imaging instruments and spectrometers, typically include a complex arrangement of components, sensors, detectors, input and output ports, energy sources, and consumable elements. Some of such scientific instruments generate relatively large volumes of data when operating, which may impact memory requirements and efficient data access.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 3 is a block diagram illustrating a specific example of the object illustrated in FIG. 2.

DETAILED DESCRIPTION

Figure 1:
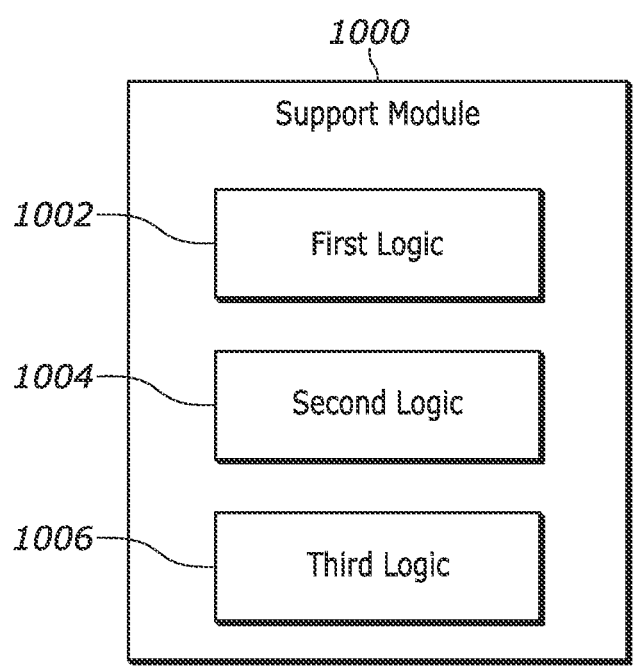
FIG. 1 is a block diagram of an example scientific instrument support module for performing support operations, in accordance with various embodiments.

Disclosed herein are scientific instrument support systems, as well as related methods, computing and storage devices, and computer-readable media. For example, in some embodiments, a support apparatus for a scientific instrument comprises a first logic, a second logic, and a third logic. The first logic is configured to acquire a first data file via one or more detectors of the scientific instrument, the first data file including unsegregated data from a plurality of scans or channels of the one or more detectors. The second logic is configured to apply automated processing to the first data file to generate a corresponding plurality of second data files based on one or more configuration settings, each of the second data files being smaller than the first data file and being named using a file naming convention referencing respective contents of different ones of the second data files. The plurality of second data files is stored in an object storage. The third logic is configured to process a data request received from a client device, the data request being for a data portion of the first data file. The third logic is further configured to provide the data portion back to the client device by accessing one or more of a first memory cache, a second memory cache, and the object storage to obtain a corresponding portion of a corresponding one of the second data files identified based on the file naming convention. The first memory cache and the second memory cache have different respective eviction policies for data loaded thereto from the object storage.

Scientific instrument support embodiments disclosed herein may achieve improved performance relative to conventional approaches and, for example, may achieve improved performance for time-of-flight (TOF) mass spectrometers, quadrupole mass spectrometers, ion trap mass spectrometers, and instruments including multiple spectrometers and/or detectors, for example, including ultraviolet (UV) detectors, diode array detectors (DADs, such as photodiode array detectors, PDAs), and chromatography-system detectors. For illustration purposes and without any implied limitations, some example embodiments are described below in reference to TOF mass spectrometers. From the provided description, a person of ordinary skill in the pertinent art will be able to make and use additional support embodiments for scientific instruments employing other types of spectrometers, detectors, devices, and various combinations thereof without any undue experimentation.

TOF mass spectrometry (TOFMS) is a method of mass spectrometry in which an ion's mass-to-charge ratio is determined by a time-of-flight measurement. Ions are accelerated by an electric field of known strength. This acceleration results in an ion having the same kinetic energy as any other ion that has the same charge. The velocity of the ion depends on the mass-to-charge ratio such that heavier ions of the same charge attain lower speeds than lighter ions. The time that the ion subsequently takes to reach a downstream detector is measured. This time depends on the velocity of the ion and, as such, provides a measure of the ion's mass-to-charge ratio. From the measured TOF mass spectrum, mass-to-charge ratios of various components thereof, and other known experimental parameters, the composition of the analyte can usually be determined.

A TOF mass spectrometer typically includes a mass analyzer and a detector. An ion source (either pulsed or continuous) is used to generate ions from the analyte. The TOF mass analyzer can be a linear flight tube or a reflectron. In various examples, the ion detector is a microchannel plate (MCP) detector or a secondary emission multiplier (SEM). The electrical signal from the detector is digitized with a time-to-digital converter (TDC) or an analog-to-digital converter (ADC). The TDC is a counting detector, and the ion counting performed thereby is typically accompanied by summing large numbers (e.g., hundreds) of individual mass spectra, which is sometimes referred to as histogramming. The corresponding TOF mass analyzer typically operates at a 5 kHz to 20 KHz repetition rate to generate a sufficiently large number of mass spectra to be summed. The ADC typically operates at the speed of about 10 giga-samples per second to digitize the pulsed ion current from the MCP detector at discrete time intervals. In various examples, the ADC has an 8-bit to 12-bit dynamic range. The use of ADCs (as opposed to TDCs) is more beneficial for some specific types of TOF mass spectrometers, such as for Matrix-Assisted Laser Desorption/Ionization (MALDI)-TOF instruments with relatively high peak currents.

The raw data detected by a mass spectrometer are typically in the form of a signal distributed across various m/z (mass-to-charge) values where ions are detected. Centroid data include raw data that have been processed via a suitable algorithm to retain only the local maximum in each mass range in which an ion is detected. Such centroid data are often referred to as a "centroid scan."

In some examples, a raw data file generated by a TOFMS instrument has a size on the order of 1 GB to 100 GB and includes data from multiple scans and/or channels in an unsegregated binary form in a file format that is specifically optimized for recording, transfer, and packaging of experimental data corresponding to a single analyte injection. In a typical data storage system, such a binary data file takes a relatively long time to transfer from object storage to a file system that enables a corresponding file reader associated with the instrument (e.g., provided by the instrument's manufacturer) to extract selected scan and/or channel data for further processing, e.g., in response to a request from a client device. The corresponding data-access delay is typically nonlinearly exacerbated for larger data files and can present a significant impediment to users and operators of the corresponding scientific instruments and/or systems.

In some use cases, an important consideration is the cost of data storage. For example, the service fees associated with object storage are typically lower (e.g., approximately by a factor of five in some specific cases) than the service fees associated with general purpose data storage. Given the fact that, for typical practical applications of various scientific instruments, raw data are accessed relatively infrequently and usually in a part-selective manner after their initial acquisition, object storage is often considered to be a preferred option.

Furthermore, the inventor(s) realized that, in some examples, object storage can be leveraged to achieve significant performance improvements through adaptation of the data structures used therefor to the way the corresponding data are used after the initial acquisition. In many use cases, such data structures are functionally different from the data structures that facilitate fast recording during the data acquisition. For example, the inventor(s) realized that generating Extracted Ion Chromatograms (XICs) can be approximately an order of magnitude faster using column-oriented storage than when the original raw data format is used for the same purpose.

In a network environment, various cache memory systems may be used to speed up data access in response to a request for data from a client device. However, given the size and structure of typical raw data files, cache memory systems may not be capable of providing sufficiently fast data access for the client device when handling large data files.

The above-indicated and possibly some other related problems in the state of the art can beneficially be addressed using various examples, aspects, features, and embodiments of systems and methods for data processing and cache management disclosed herein. In a representative example, a cache management system is designed and configured to take into consideration various factors relating to the types of measurements performed by the instrument and/or data-analyses criteria specified in the data-access request received from the client device. In some examples, the cache management system operates in a cloud or enterprise environment to provide fast data access and data processing based on mass-spectrometry criteria. In various examples, such mass-spectrometry criteria include but are not limited to scans, scan types, instrument types, scan fragments corresponding to specified mass ranges around the requested mass(es), and the like. At least some embodiments beneficially reduce data-access delays with respect to the typical delays associated with previous data-access solutions. At least some embodiments support horizontal scaling, which beneficially mitigates latency fluctuations associated with changes to the workload of the data-delivery service.

Accordingly, embodiments disclosed herein provide improvements to scientific instrument technology (e.g., improvements in the computer technology supporting such scientific instruments, among other improvements). For example, various embodiments disclosed herein may achieve improved (e.g., faster selective) access to scientific-instrument data relative to conventional approaches. In various examples, the improvements are directed at achieving one or more of the following goals: (a) ability to store petabytes of raw data in inexpensive cloud storage with relatively fast selective access to any selected portions of the data; (b) ability to scale caching and other data operations across multiple servers; (c) support for parallel (e.g., substantially simultaneous) access to data from many (e.g., up to a thousand of) client devices; (d) multi-stage caching for improved query performance; (e) fast traversal across time-series data using column-oriented file formats; (f) support for Representational State Transfer (REST) Application Programming Interface (API), unary general-purpose Remote Procedure Call (gRPC), and streaming calls for better in-cluster performance; (g) compatibility with different types of object storage; (h) portability between on-premises and cloud deployments through relatively straightforward configuration changes; and (i) flexibility in data access modes, e.g., with FaaS functions, various programming languages, "big data" solutions, and the like. Herein, the acronym "FaaS" stands for function as a service, which is a category of cloud computing services allowing customers to develop, run, and manage application functionalities without the complexity of building and maintaining the infrastructure typically associated with developing and launching an app.

According to some embodiments, provided is a data-storage method comprising the steps of: (i) converting a large raw instrument data file into a corresponding plurality of smaller data files more suitable for storing time-series data; (ii) generating a common metadata file for the plurality of such smaller data files, with the metadata detailing pertinent parameters of the conversion process; (iii) assembling data portions from different areas of the raw instrument data file into records; (iv) segregating different streams stored in the raw instrument data file into one or more streams of records; (v) further segregating streams into groups, for example, a selected fixed number (e.g., 100) of centroid scans per stream; and (vi) using suitable object storage naming conventions (e.g., conceptually similar to file paths) to quickly locate and then transfer the needed group(s) of a stream from the object storage to cache memory to reduce the frequency of recurring transfers. In various examples, cache management policies governing the cache memory operations provide for the transfer of only relatively small portions of data objects sufficient for resolving the pending data request. Example benefits of such cache management policies include (i) significant reduction in the amount of data being stored in more-expensive cache memory and (ii) faster data access due to the smaller size of the data portions being transferred to the cache memory in case of a cache miss. In some examples, the raw-data REST and gRPC API services are designed to horizontally scale as demand increases, with the cache tier being shared across multiple compute instances. In such examples, synchronization of transferring data from the object storage into the cache memory is achieved with a distributed cache. The distributed cache allows one instance to initiate a copy into the cache and other instances to wait until the transfer is complete when access to the same cached data is needed.

Various ones of the embodiments disclosed herein may improve upon conventional approaches to achieve the technical advantages of improved data operations performed via file conversion and data segregation and with optimized cache-management policies. Such technical advantages may not be achievable by routine and conventional approaches, and all users of systems including such embodiments may benefit from these advantages (e.g., by assisting the user in speeding up a technical task, such as processing and analyses of experimental data). The technical features of the embodiments disclosed herein are thus decidedly unconventional in the field of instrument-related data storage, as are various combinations of the features disclosed herein. As discussed further herein, various aspects of the embodiments disclosed in this document may improve the functionality of a computer itself, for example, by operating the instrument-related data storage in an optimized manner resulting in a higher level of productivity. The computational features disclosed herein do not only involve the collection and comparison of information but apply new analytical and technical tools to change the operation of the instrument-related data storage. The present disclosure thus introduces functionality that neither a conventional computing device, nor a human, can perform.

Accordingly, embodiments of the present disclosure may serve any of a plurality of technical purposes, such as controlling a specific technical system or process; determining from measurements how to control or configure a machine; or increasing throughput of a data pipeline. Some examples disclosed herein provide solutions to technical problems, including but not limited to improvements to TOFMS instruments, e.g., improvements in the computer technology supporting the TOFMS instruments, among other improvements.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of values, the phrase "between X and Y" represents a range that includes X and Y. As used herein, an "apparatus" may refer to any individual device, collection of devices, part of a device, or collections of parts of devices. The drawings are not necessarily to scale.

FIG. 1 is a block diagram illustrating a scientific instrument support module 1000 for performing support operations, in accordance with various embodiments. The scientific instrument support module 1000 may be implemented by circuitry (e.g., including electrical and/or optical components), such as a programmed computing device. The logic of the scientific instrument support module 1000 may be included in a single, common computing device or may be distributed across multiple computing devices that are in communication with each other as appropriate. Examples of computing devices that may, singly or in combination, implement the scientific instrument support module 1000 are discussed herein with reference to a computing device 6000 of FIG. 6, and examples of systems of interconnected computing devices, in which the scientific instrument support module 1000 may be implemented across one or more of the computing devices, are discussed herein with reference to the scientific instrument support system 7000 of FIG. 7.

As illustrated in FIG. 1, the scientific instrument support module 1000 includes first logic 1002, second logic 1004, and third logic 1006 for performing support methods as described herein for a scientific instrument, such as, for example, a TOFMS instrument. As used herein, the term "logic" may include an apparatus that is configured to perform a set of operations associated with the logic. For example, any of the logic elements included in the scientific instrument support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in the module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

The first logic 1002 may acquire one or more raw instrument data files corresponding to one or more analytes via the one or more detectors of the TOFMS instrument. As indicated above, to perform such acquisition, ions generated via the ion source of the TOFMS instrument are directed through the mass analyzer and detected via one or more detectors of the TOFMS instrument. Accordingly, the first logic 1002 may acquire data via the TOFMS instrument at one or more settings of the mass analyzer and detector(s). The first logic 1002 may then include one or more parameters associated with the settings into the data files.

The second logic 1004 may apply automated processing to the one or more raw instrument data files acquired via the first logic 1002. In various examples, the automated processing includes one or more of: (i) converting each of the large raw instrument data files into a corresponding plurality of smaller data files; (ii) generating a metadata file for the plurality of smaller data files based on one or more parameters associated with the settings of the TOFMS instrument included into the raw data by the first logic 1002 and further based on the pertinent parameters of the conversion from the large raw data file into the plurality of smaller data files; and (iii) naming individual files of the plurality using a naming convention suitable for referencing the contents thereof. In some examples, the processing step of converting includes some or all of the following sub-steps: (a) assembling different data portions of the raw data file into records; (b) segregating different data streams of the raw data file into one or more streams of records; and (c) further segregating streams into groups.

The third logic 1006 may handle data requests received from various client devices. Accordingly, based on a data request, the third logic 1006 may perform the following operations. First, the third logic 1006 may map the received data request onto a corresponding data file of the plurality of smaller data files generated via the second logic 1004, e.g., based on the naming convention. Once the name of the smaller data file is identified through the mapping, the third logic 1006 may check the in-memory Least Recently Used (LRU) cache for the identified data file. If the LRU cache has the identified data file, then the third logic 1006 causes the file to be retrieved therefrom, filtered to get the requested scan data, and sent back to the requesting client device. If the LRU cache does not have the identified data file, then the third logic 1006 initiates a lookup for the file in the local file cache. If the file is found in the local file cache, then the third logic 1006 causes the needed data to be read from there and further causes a copy of the data file to be loaded into the LRU cache. If the file is not found in the local file cache, then the third logic 1006 may query the corresponding database (e.g., Redis) to see if another service instance has the corresponding object. If another service instance has a copy of the object, then the third logic 1006 may request it from that instance, e.g., using a high-speed, binary serialization protocol for the request. If no service instance has the object, then the third logic 1006 may request a copy of the object from the object storage for the local file system and update the Redis to indicate that a local copy of the object now exists. The third logic 1006 may then cause the local file copy to be read, added to the in-memory LRU cache, and directed to the requesting client device after appropriate data filtering as indicated above.

As used herein, the term "Redis" stands for Remote Dictionary Server. A Redis is an advanced key-value store that can function as a Not only Structured Query Language (NoSQL) database or as a memory-cache store to improve performance when serving data that are stored in the system memory. Redis supports, inter alia, various data structures, such as strings, hashes, sets, lists, sorted sets, bitmaps, and geo-spatial indices with radius queries. In various additional examples, other (than Redis) distributed in-memory data stores can also be used.

Figure 2:
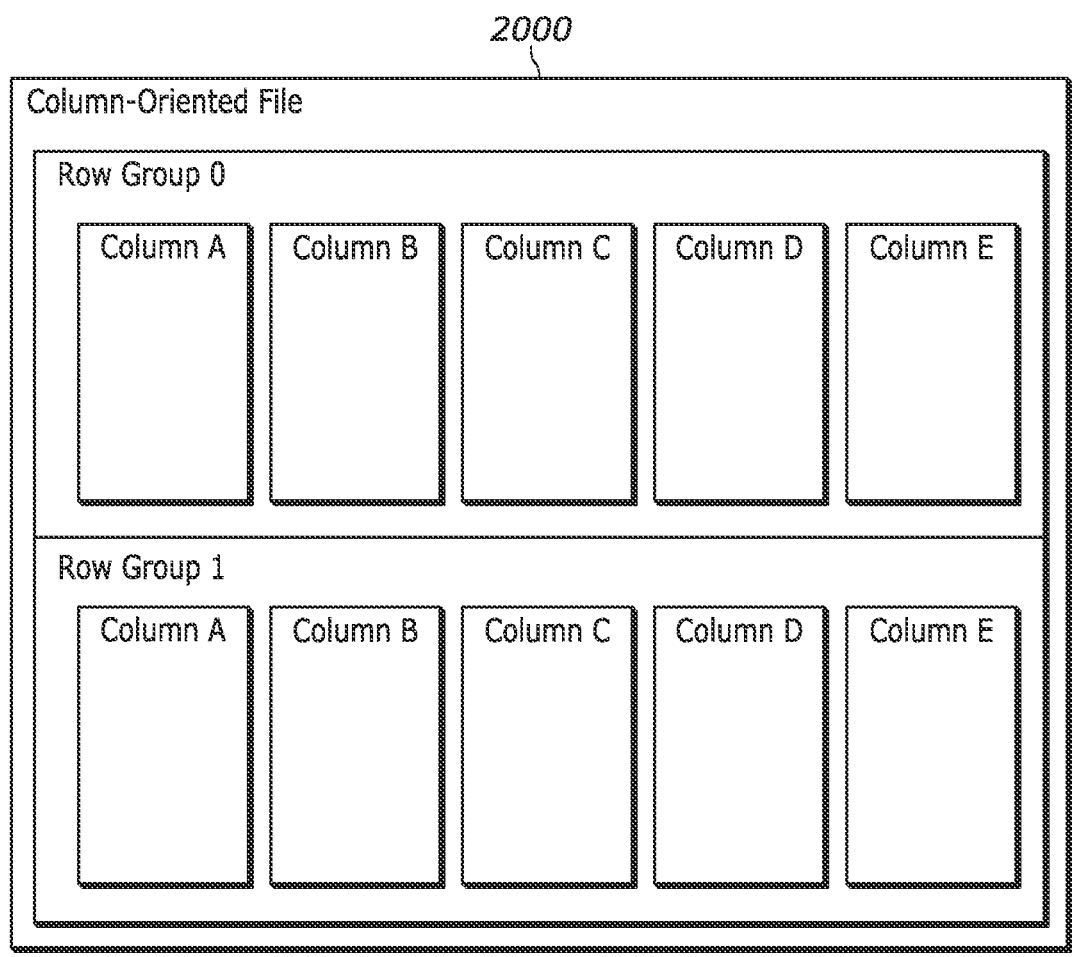
FIG. 2 is a block diagram illustrating an example data structure (object) generated via the scientific instrument support module of FIG. 1 by applying automated processing to a raw instrument data file, in accordance with various embodiments.

FIG. 2 is a block diagram illustrating a data structure (object) 2000 that may be generated via the second logic 1004 by applying automated processing to a raw instrument data file according to an embodiment. In the example shown, the object 2000 is a column-oriented file partitioned into row groups. For illustration purposes and without any implied limitations, the object 2000 is shown in FIG. 2 as having two row groups, labeled Row Group 0 and Row Group 1, respectively. In other examples, the corresponding object 2000 can have a different (from two) number of row groups (e.g., see FIG. 3). Each of the row groups has columns, each of the columns being an array of data of the same data type. For illustration purposes and without any implied limitations, each of Row Group 0 and Row Group 1 is shown as having five respective columns, which are labeled Column A through Column E, respectively. In a representative example, a column of a row group can be read from disk into other memory independently.

In operation, the scientific instrument support module 1000 may cause a plurality of objects 2000 to be stored in the object storage. When needed, the scientific instrument support module 1000 may cause a particular object 2000 needed for access to the data stored therein to be copied into the local file cache of the service instance. The scientific instrument support module 1000 may further cause individual columns of each row group to be individually read from the local file cache and cached into an in-memory LRU cache for faster access. In a representative example, the in-memory LRU cache is smaller than the local file cache, with example sizes being about 1 Gb and 100 Gb, respectively. The LRU cache and the local file cache have different respective eviction policies. In one example, the LRU cache is configured to evict the least recently accessed data when the LRU cache has reached its memory limit and an additional piece of data needs to be added to the cache. In contrast, the local file cache comprises a local directory structure that can be cleaned up asynchronously based on the total number of files cached therein and/or the total disk space used. For example, when individual files have metadata, such as the "created" timestamp and/or "last-accessed" timestamp, files can be evicted from the local file cache based on the age, e.g., the oldest files are deleted first, or the time elapsed since the last access, e.g., the least-recently accessed files are deleted first.

FIG. 3 is a block diagram illustrating a specific example of the object 2000. In the example shown, the object 2000 has one hundred row groups, labeled RG1 through RG100, respectively. Each of the row groups RGn has six columns labeled 3001 through 3006. The data types of the columns 3001-3006 are indicated in the header row 3010. In this example, the data types are: Centroid Scan Number, Mass, Peak Intensity, Baseline, Noise, and Resolution. The number of rows in the row group RGn may vary from row group to row group. In different specific examples, the objects 2000 may have different numbers of respective row groups RGn or the same fixed number of respective row groups RGn. In some examples, the range of masses covered by a row group may be reduced whereas the number of row groups per object 2000 may be increased to optimize the scan traversal for certain analytes and/or types of data analyses.

In a representative example, a row group RGn in column-oriented storage is a group of arrays of a manageable size. In some cases, a row group RGn may have columns for the scan number, mass, intensity, etc. Each of those columns may have a large number (e.g., 100,000) entries (rows). However, some of smaller secondary files may have only one row group, with each row containing a centroid peak, such that the entire secondary file has the centroid peaks for the range of 100 scans. Each column in each row group RGn is individually compressed so that the row group is more suitable to serve as a block of data that can be decompressed and loaded into memory. In some examples, there is no direct correspondence between a centroid scan and a row group. In one of such examples, an Optimized Row Columnar (ORC) file contains one hundred centroid scans but limits each row group RGn to 10 centroid scans, with each row in the row group representing a centroid peak.

In one embodiment, the LRU cache key is assembled from contextual information. An example of such contextual information is provided by the following string:

$$\{\text{Injection Identifier}\}/\{\text{Column Oriented Group}\} \quad (1)$$
$$/\{\text{Row Group}\}/\{\text{Column Identifier}\}$$

The naming convention may be such that if the original raw data file is named "03_lumos_prg_sa_r1.raw", then the second logic 1004 may be configured to use this filename as the injection identifier in the above string. If the values are for centroid scan numbers 1 to 100 and mass values of Row Group 0 are being cached, then the corresponding LRU key may be in the form of the following string:

$$03\_lumos\_prg\_sa\_r1 / centroid\_00001-00100/0/mass \quad (2)$$

The corresponding intensities for these masses may be accessed with another LRU key, e.g., expressed by the following string:

$$03\_lumos\_prg\_sa\_r1/centroid\_00001-00100/0/intensity \quad (3)$$

When a value is retrieved from the LRU cache, it may be in the form of an array of double precision floating point numbers, e.g., because this particular data type is specified for the corresponding column in the column-oriented storage format. In other embodiments, other suitable naming conventions and data types and formats may also be used.

Figure 4:
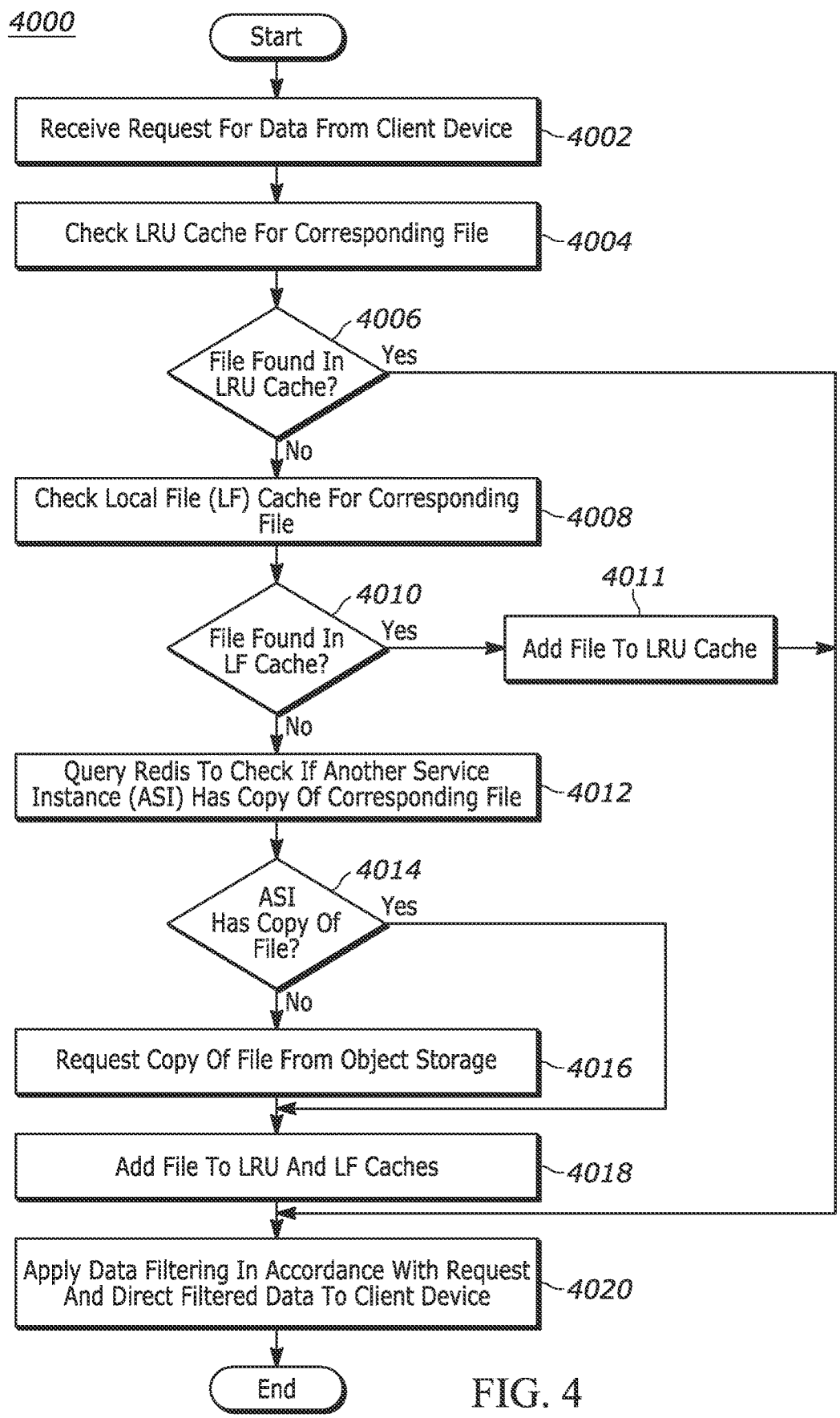
FIG. 4 is a flowchart of a data-delivery method applied via the scientific instrument support module of FIG. 1, in accordance with various embodiments.

FIG. 4 is a flowchart of a data-delivery method 4000 according to an embodiment. In one example, the method 4000 is implemented using the scientific instrument support module 1000. The method 4000 is described below with continued reference to FIGS. 1-3.

The method 4000 includes the scientific instrument support module 1000 receiving a request for data from a client device (in block 4002). In a typical example, the request identifies a specific piece of data that needs to be returned to the client device in response to the request. Such identification can be performed using the applicable naming convention, illustrative examples of which have been described above. For example, a request received in the block 4002 may specify a centroid scan for injection "03_lumos_prg_sa_r1," scan number 42. The corresponding object 2000 may thus be the example object 2000 of FIG. 3.

The method 4000 also includes the scientific instrument support module 1000 checking the in-memory LRU cache for the requested piece of data (in block 4004). Such checking in the block 4004 may include generating the corresponding LRU cache lookup key(s), which, for example, can be in the form indicated by the Strings (2) and (3) above. The method 4000 also includes determining if the LRU cache has the (smaller) data file identified by the key(s) (in decision block 4006). If the LRU cache has the data file ("Yes" at the decision block 4006), then the processing of the method 4000 is directed to block 4020. Otherwise ("No" at the decision block 4006), the processing of the method 4000 is directed to block 4008.

The method 4000 also includes the scientific instrument support module 1000 checking the local file cache for the corresponding data file (in block 4008). Such checking in the block 4008 may include using the applicable file-naming convention to search the directory structure of the local file cache for the corresponding filename. The method 4000 further includes determining if the local file cache has the file identified by the filename (in decision block 4010). If the local file cache has the file ("Yes" at the decision block 4010), then the processing of the method 4000 is directed to block 4011. Otherwise ("No" at the decision block 4010), the processing of the method 4000 is directed to block 4012. The method 4000 also includes the scientific instrument support module 1000 causing the local file copy to be read and added to the LRU cache (in block 4011).

The method 4000 includes the scientific instrument support module 1000 querying the Redis to check if another service instance has a copy of the corresponding file (in block 4012). The method 4000 further includes the scientific instrument support module 1000 receiving a response from the Redis and determining, based on the received response, if another service instance has such copy (in decision block 4014). If another service instance has the file ("Yes" at the decision block 4014), then the processing of the method 4000 is directed to block 4018. Otherwise ("No" at the decision block 4014), the processing of the method 4000 is directed to block 4016.

The method 4000 also includes the scientific instrument support module 1000 requesting a copy of the file (object) from the object storage and receiving the requested copy (in block 4016). The method 4000 also includes the scientific instrument support module 1000 updating the Redis to indicate that a local copy of the object now exists (in block 4016). The method 4000 further includes the scientific instrument support module 1000 causing the received file copy to be added to the LRU and local file caches (in block 4018).

The method 4000 further includes the scientific instrument support module 1000 applying data filtering to the corresponding file (in block 4020). The applied filtering is in accordance with the request received in the block 4002. The method 4000 further includes the scientific instrument support module 1000 directing the resulting filtered data to the client device (in block 4020).

Figure 5:
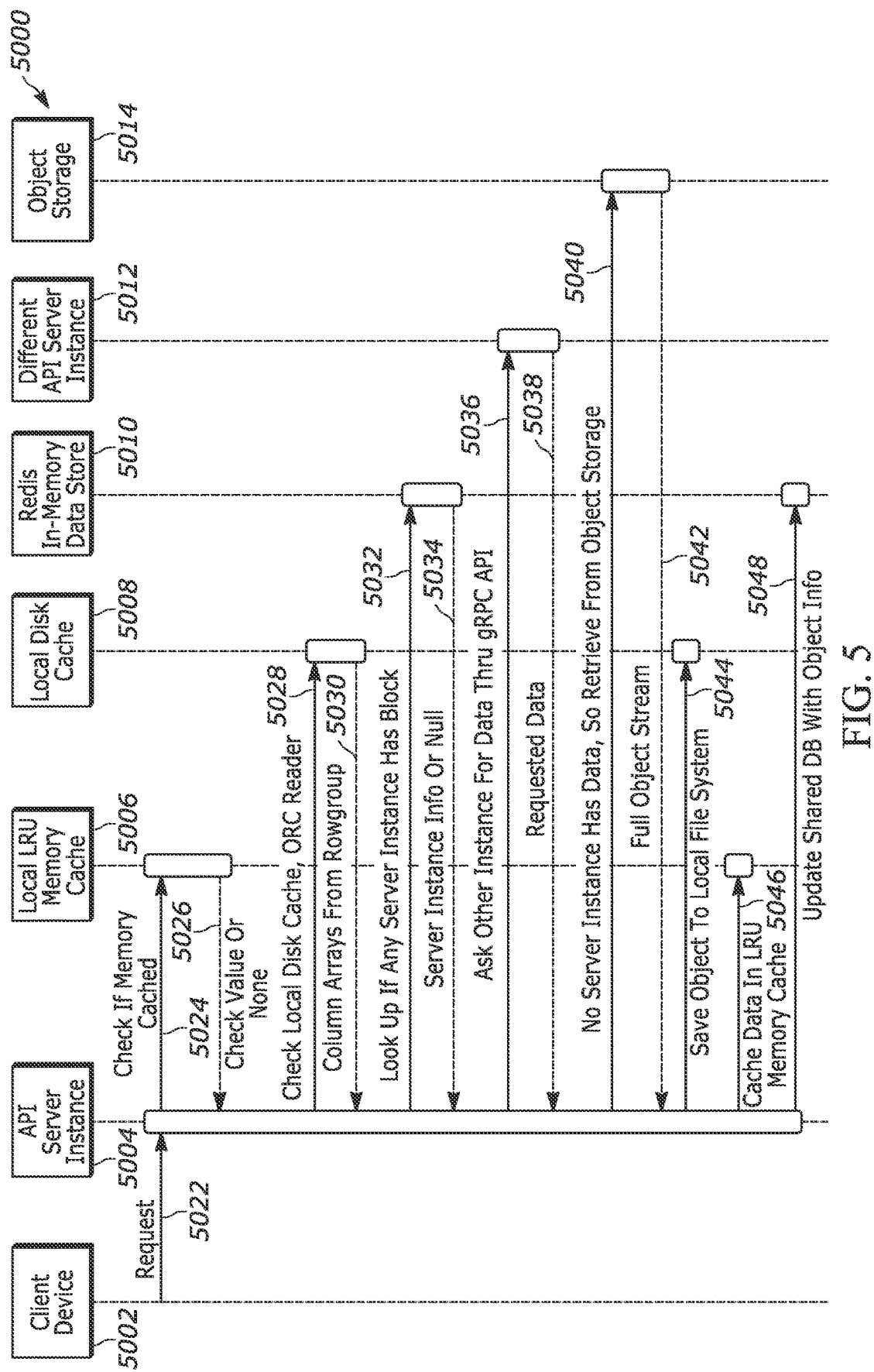
FIG. 5 is a block diagram illustrating communications and data flows between various components of a distributed computing system, in accordance with various embodiments.

FIG. 5 is a block diagram illustrating communications and data flows between various components of a distributed computing system 5000 according to an embodiment. In at least some examples, the communications and data flows in the system 5000 may be in accordance with the method 4000. In some examples, the scientific instrument support module 1000 may be in operative communication with the system 5000. In some other examples, some parts of the scientific instrument support module 1000 may be implemented within the system 5000.

In the example shown, the system 5000 comprises API server instances 5004 and 5012, a local LRU memory cache 5006, a local disk cache 5008, a Redis in-memory data store 5010, and object storage 5014. Various transmissions within the system 5000 shown in FIG. 5 are triggered by a request 5022 for data received by the API server instance 5004 from a client device 5002. The request 5022 may be in accordance with the operations of the block 4002 of the method 4000.

In response to the request 5022, the API server instance 5004 sends a corresponding query 5024 to the local LRU memory cache 5006. The query 5024 may be in accordance with the operations of the block 4004 of the method 4000. The local LRU memory cache 5006 sends a response 5026 to the query 5024, which either returns the requested data or informs the API server instance 5004 that the requested data are not found. With the latter outcome of the query 5024, the API server instance 5004 sends a corresponding query 5028 to the local disk cache 5008. The query 5028 may be in accordance with the operations of the block 4008 of the method 4000. The local disk cache 5008 sends a response 5030 to the query 5028, which either returns the requested data or informs the API server instance 5004 that the requested data are not found. With the latter outcome of the query 5028, the API server instance 5004 sends a next corresponding query 5032 to the Redis in-memory data store 5010. The query 5032 may be in accordance with the operations of the block 4012 of the method 4000. The Redis in-memory data store 5010 sends a response 5034 to the query 5032, which either identifies the other API server instance having the requested data or informs the API server instance 5004 that there are no such server instances.

In one example outcome of the query 5032, the response 5034 identifies the API server instance 5012. With such an outcome, the API server instance 5004 sends a request 5036 for the corresponding data to the API server instance 5012. In response to the request 5036, the API server instance 5012 returns a response 5038 with the requested data.

In another example outcome of the query 5032, the response 5034 informs the API server instance 5004 that there are no server instances with the corresponding data. With such an outcome, the API server instance 5004 operates to access, via a command 5040, the object storage 5014 and receive back a corresponding data stream 5042 with the corresponding data file (e.g., an object 2000). The command 5040 and the data read 5042 may be in accordance with the operations of the block 4016 of the method 4000. Once the object is received, the API server instance 5004 saves the fetched object and/or pertinent portions thereof in the local LRU memory cache 5006 and the local disk cache 5008. The corresponding data writes 5044, 5046 may be in accordance with pertinent operations of the blocks 4011, 4018. The API server instance 5004 further operates to send an update 5048 to the Redis in-memory data store 5010, which provides the database therein with appropriate information on the fetched object(s).

Figure 6:
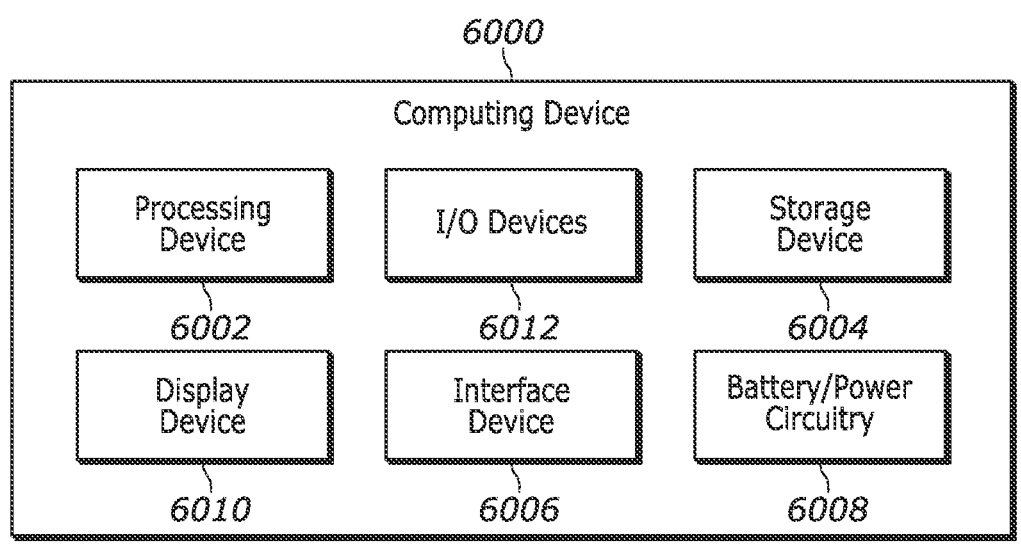
FIG. 6 is a block diagram illustrating an example computing device that may perform some or all of the scientific instrument support methods and/or functions disclosed herein, in accordance with various embodiments.

As noted above, the scientific instrument support module 1000 may be implemented by one or more computing devices. FIG. 6 is a block diagram of a computing device 6000 that may perform some or all of the scientific instrument support functions and/or methods disclosed herein, in accordance with various embodiments. In some embodiments, the scientific instrument support module 1000 may be implemented by a single computing device 6000 or by multiple computing devices 6000. Further, as discussed below, a computing device 6000 (or multiple computing devices 6000) that implement(s) the scientific instrument support module 1000 may be part of one or more of a scientific instrument 7010, a user local computing device 7020, a service local computing device 7030, or a remote computing device 7040 of FIG. 7.

The computing device 6000 of FIG. 6 is illustrated as having a number of components, but any one or more of these components may be omitted or duplicated, as suitable for the application and setting. In some embodiments, some or all of the components included in the computing device 6000 may be attached to one or more motherboards and enclosed in a housing (e.g., including plastic, metal, and/or other materials). In some embodiments, some of these components may be fabricated onto a single system-on-a-chip (SoC) (e.g., an SoC may include one or more processing devices 6002 and one or more storage devices 6004). Additionally, in various embodiments, the computing device 6000 may not include one or more of the components illustrated in FIG. 6, but may include interface circuitry (not explicitly shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 6000 may not include a display device 6010, but may include display device interface circuitry (e.g., a connector and driver circuitry) to which a display device 6010 may be coupled.

The computing device 6000 may include a processing device 6002 (e.g., one or more processing devices). As used herein, the term "processing device" may refer to any device or portion of a device that processes electronic data from registers and/or memory to transform that electronic data into other electronic data that may be stored in registers and/or memory. The processing device 6002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 6000 may include a storage device 6004 (e.g., one or more storage devices). The storage device 6004 may include one or more memory devices such as random-access memory (RAM) devices (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 6004 may include memory that shares a die with a processing device 6002. In such an embodiment, the memory may be used as cache memory and may include embedded dynamic random-access memory (eDRAM) or spin transfer torque magnetic random access memory (STT-MRAM), for example. In some embodiments, the storage device 6004 may include non-transitory computer readable media having instructions thereon that, when executed by one or more processing devices (e.g., the processing device 6002), cause the computing device 6000 to perform any appropriate ones or portions of the methods disclosed herein.

The computing device 6000 may include an interface device 6006 (e.g., one or more interface devices 6006). The interface device 6006 may include one or more communication chips, connectors, and/or other hardware and software to govern communications between the computing device 6000 and other computing devices. For example, the interface device 6006 may include circuitry for managing wireless communications for the transfer of data to and from the computing device 6000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 7006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 7006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 7006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 7006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 7006 may include one or more antennas (e.g., one or more antenna arrays) to receipt and/or transmission of wireless communications.

In some embodiments, the interface device 6006 may include circuitry for managing wired communications, such as electrical, optical, or any other suitable communication protocols. For example, the interface device 6006 may include circuitry to support communications in accordance with Ethernet technologies. In some embodiments, the interface device 6006 may support both wireless and wired communication, and/or may support multiple wired communication protocols and/or multiple wireless communication protocols. For example, a first set of circuitry of the interface device 6006 may be dedicated to shorter-range wireless communications such as Wi-Fi or Bluetooth, and a second set of circuitry of the interface device 7006 may be dedicated to longer-range wireless communications such as global positioning system (GPS), EDGE, GPRS, CDMA, WiMAX, LTE, EV-DO, or others. In some embodiments, a first set of circuitry of the interface device 6006 may be dedicated to wireless communications, and a second set of circuitry of the interface device 6006 may be dedicated to wired communications.

The computing device 6000 may include battery/power circuitry 6008. The battery/power circuitry 6008 may include one or more energy storage devices (e.g., batteries or capacitors) and/or circuitry for coupling components of the computing device 6000 to an energy source separate from the computing device 6000 (e.g., AC line power).

The computing device 6000 may include a display device 6010 (e.g., multiple display devices). The display device 6010 may include any visual indicators, such as a heads-up display, a computer monitor, a projector, a touchscreen display, a liquid crystal display (LCD), a light-emitting diode display, or a flat panel display.

The computing device 6000 may include other input/output (I/O) devices 6012. The other I/O devices 6012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 6000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 6000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

In some examples, the computing device 6000 is implemented using a plurality of pods in a Kubernetes cluster. A representative Kubernetes cluster comprises a plurality of computer nodes configurable to host multiple pods, each functioning as a virtual machine. In various deployments, several instances of a micro-service can be run on a single pod or on multiple pods (also see FIG. 8). In some examples, better performance is achieved when some of the multiple pods are distributed across different computer nodes.

Figure 7:
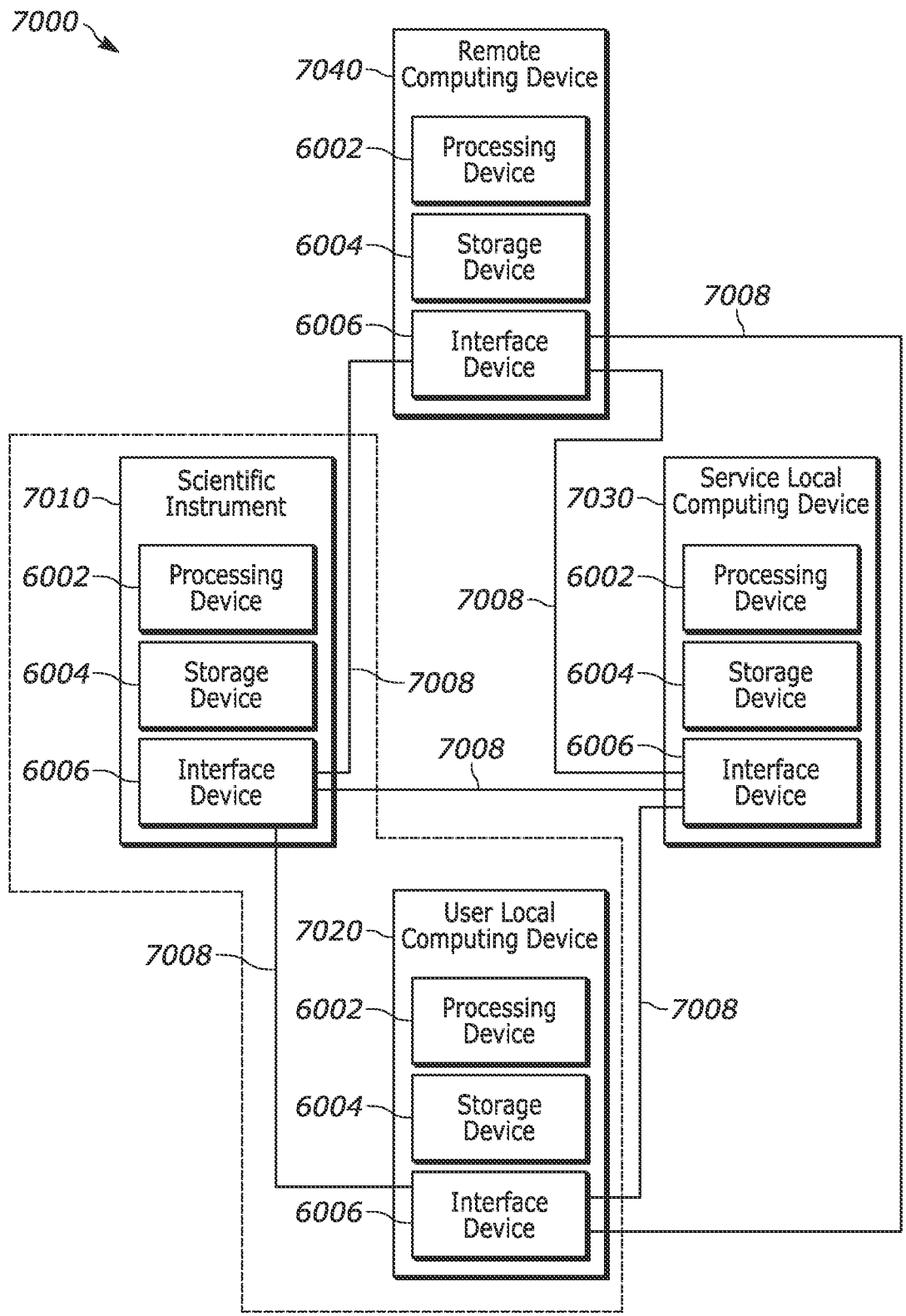
FIG. 7 is a block diagram illustrating an example scientific instrument support system in which some or all of the scientific instrument support methods and/or functions disclosed herein may be performed, in accordance with various embodiments.

One or more computing devices implementing any of the scientific instrument support modules or methods disclosed herein may be part of a scientific instrument support system. FIG. 7 is a block diagram of an example scientific instrument support system 7000 in which some or all of the scientific instrument support methods disclosed herein may be performed, in accordance with various embodiments. The scientific instrument support modules and methods disclosed herein (e.g., the scientific instrument support module 1000 of FIG. 1 and the method 4000 of FIG. 4) may be implemented by one or more of the scientific instrument 7010, the user local computing device 7020, the service local computing device 7030, and the remote computing device 7040 of the scientific instrument support system 7000.

Any of the scientific instrument 7010, the user local computing device 7020, the service local computing device 7030, or the remote computing device 7040 may include any of the embodiments of the computing device 6000 discussed herein with reference to FIG. 6, and any of the scientific instrument 7010, the user local computing device 7020, the service local computing device 7030, or the remote computing device 7040 may take the form of any appropriate ones of the embodiments of the computing device 6000 discussed herein with reference to FIG. 6.

The scientific instrument 7010, the user local computing device 7020, the service local computing device 7030, and/or the remote computing device 7040 may each include a respective processing device 6002, a respective storage device 6004, and a respective interface device 6006. The processing device 6002 may take any suitable form, including the form of any of the processing devices 6002 discussed herein with reference to FIG. 6, and the processing devices 6002 included in different ones of the scientific instrument 7010, the user local computing device 7020, the service local computing device 7030, or the remote computing device 7040 may take the same form or different forms. The storage device 6004 may take any suitable form, including the form of any of the storage devices 6004 discussed herein with reference to FIG. 6, and the storage devices 6004 included in different ones of the scientific instrument 7010, the user local computing device 7020, the service local computing device 7030, or the remote computing device 7040 may take the same form or different forms. The interface device 6006 may take any suitable form, including the form of any of the interface devices 6006 discussed herein with reference to FIG. 7, and the interface devices 6006 included in different ones of the scientific instrument 7010, the user local computing device 7020, the service local computing device 7030, or the remote computing device 7040 may take the same form or different forms.

The scientific instrument 7010, the user local computing device 7020, the service local computing device 7030, and the remote computing device 7040 may be in communication with other elements of the scientific instrument support system 7000 via communication pathways 7008. The communication pathways 7008 may communicatively couple the interface devices 6006 of different ones of the elements of the scientific instrument support system 7000, as shown, and may be wired or wireless communication pathways (e.g., in accordance with any of the communication techniques discussed herein with reference to the interface devices 6006 of the computing device 6000 of FIG. 6). The particular scientific instrument support system 7000 depicted in FIG. 7 includes communication pathways between each pair of the scientific instrument 7010, the user local computing device 7020, the service local computing device 7030, and the remote computing device 7040, but this "fully connected" implementation is purely illustrative, and in various embodiments, various ones of the communication pathways 7008 may be absent. For example, in some embodiments, a service local computing device 7030 may not have a direct communication pathway 7008 between its interface device 6006 and the interface device 6006 of the scientific instrument 7010, but may instead communicate with the scientific instrument 7010 via the communication pathway 7008 between the service local computing device 7030 and the user local computing device 7020 and the communication pathway 7008 between the user local computing device 7020 and the scientific instrument 7010. The scientific instrument 7010 may comprise any appropriate scientific instrument, such as, for example, a TOFMS instrument.

Figure 8:
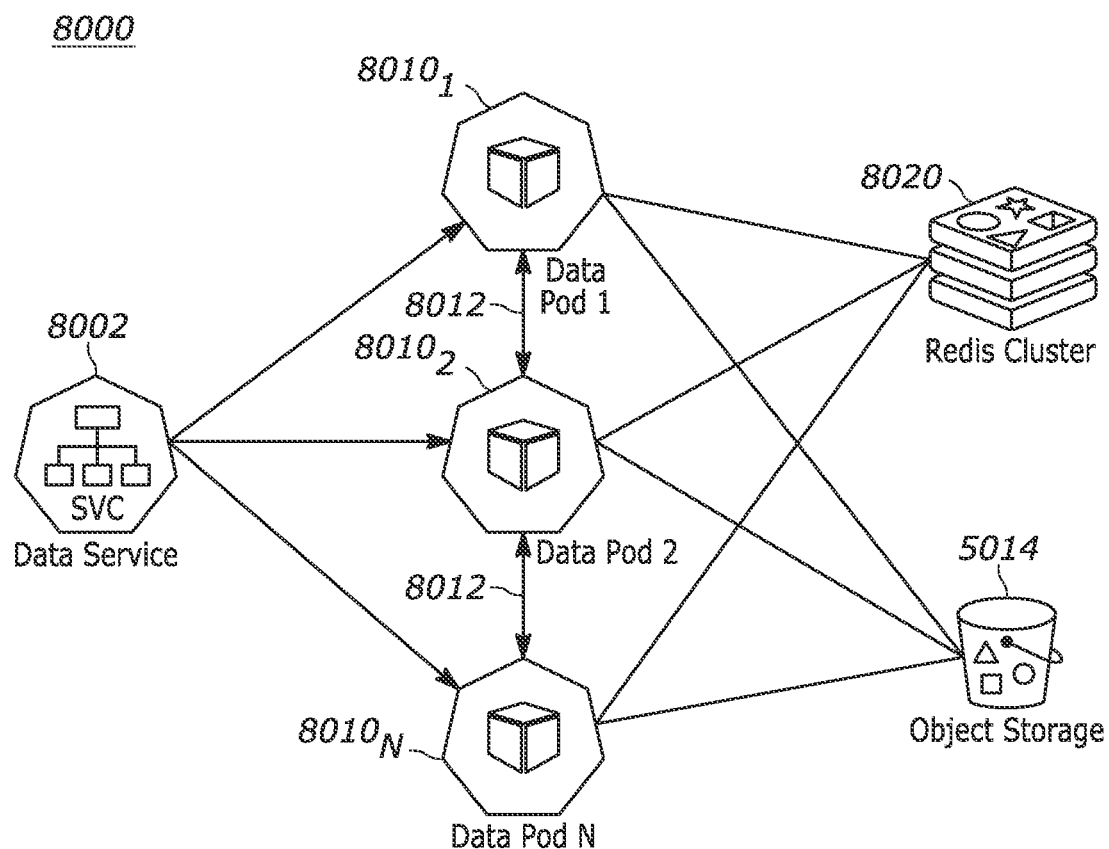
FIG. 8 is a block diagram illustrating a cloud-hosted deployment used with the scientific instrument support module of FIG. 1, in accordance with various embodiments.

FIG. 8 is a block diagram illustrating a cloud-hosted deployment 8000 used with the scientific instrument support module 1000 according to an embodiment. The deployment 8000 is a K8s deployment with horizontal scaling and the use of local volumes. Herein, K8s (also known as Kubernetes or "kube") refers to an open-source container orchestration platform that automates many of the manual processes involved in deploying, managing, and scaling containerized applications. Horizontal scaling means that, in response to an increased workload, the deployment 8000 increases the number N of deployed data pods 8010$n$, where n=1, 2, . . . , N. This response is different from vertical scaling, which typically comprises assigning more resources (for example, memory or CPU) to the data pods 8010, that are already running for the workload. When the workload decreases, and the number N of the deployed data pods 80101-8010N is above the preset minimum, the number N is scaled back down. In various examples, each data pod 8010, in the deployment 8000 has a respective configurable first-in/first-out (FIFO) in-memory cache.

The deployment 8000 runs a data service 8002 configured to handle data requests, such as the request 5022 (FIG. 5), received from various client devices, such as the client device 5002 (FIG. 5). The deployment 8000 includes the object storage 5014 (also see FIG. 5). The deployment 8000 also includes a Redis cluster 8020, which is used, inter alia, for bookkeeping of data, pod discovery, and orchestrating publish/subscribe (pub/sub) events. Pub/sub messaging is a form of asynchronous service-to-service communication that can be used in serverless and microservices architectures. In a pub/sub model, any message published to a topic is received by all of the subscribers to the topic. In the deployment 8000, pub/sub messaging is used to distribute change events from the corresponding database(s). These events can be used to construct a view of the database state and state history for parallel processing and workflows.

In operation, chunks of streams that have been transferred from the object storage 5014 are cached on the local volume of the corresponding data pod 8010$n$. Different ones of the data pods 80101-8010N may query the Redis cluster 8020 to see which data pod 8010$n$, if any, has the requested data. Such queries may be in accordance with the operations of the block 4012 of the method 4000. The query 5032 illustrated in FIG. 5 is an example of such a query. The Redis cluster 8020 responds to the query 5032 by either identifying the data pod 8010, having the requested data or informing the inquiring data pod that none of the data pods 80101-8010N have the requested data. Depending on the specific response from the Redis cluster 8020, the inquiring data pod acts either to request and receive the data from the identified data pod 8010, via one or more lateral links 8012 (also see elements 5036, 5038 in FIG. 5) or to retrieve the data from the object storage 5014 (also see elements 5040, 5042 in FIG. 5).

According to an example embodiment disclosed above, e.g., in reference to any one or any combination of some or all of FIGS. 1-8, provided is a support apparatus for a scientific instrument, the support apparatus comprising: first logic configured to acquire a first data file via one or more detectors of the scientific instrument, the first data file including unsegregated data from a plurality of scans or channels of the one or more detectors; second logic configured to apply automated processing to the first data file to generate a corresponding plurality of second data files based on one or more configuration settings, each of the second data files being smaller than the first data file and being named using a file naming convention referencing respective contents of different ones of the second data files, the corresponding plurality of the second data files being stored in an object storage; and third logic configured to process a data request received from a client device, the data request being for a data portion of the first data file, the third logic being further configured to provide the data portion back to the client device by accessing one or more of a first memory cache, a second memory cache, and the object storage to obtain a corresponding portion of a corresponding one of the second data files identified based on the file naming convention, the first memory cache and the second memory cache having different respective eviction policies for data loaded thereto from the object storage. In some examples, the configuration settings are derived by the corresponding file converter based on metadata and time-series data recorded in the first data file. In one specific example, the derived settings include the maximum number of centroid scans per second data file or the maximum number of log records per second data file. In some examples, different configuration settings may apply to different parts of the first data file, e.g., as specified in the corresponding metadata portions thereof. In some examples, the metadata specify or derived from one or more instrument and/or detector settings used to acquire the first data file.

In some embodiments of the above apparatus, the scientific instrument comprises at least one of a mass spectrometer and a chromatography system.

In some embodiments of any of the above apparatus, the third logic is configured to access the second cache in response to a cache miss for the data portion in the first cache.

In some embodiments of any of the above apparatus, the third logic is further configured to query a deployment database to determine if another service instance has a copy of the corresponding portion of the corresponding one of the second data files.

In some embodiments of any of the above apparatus, the third logic is further configured to obtain a copy of the corresponding one of the second data files from the object storage when no service instance has the copy of the corresponding portion of the corresponding one of the second data files.

In some embodiments of any of the above apparatus, the second cache is larger than the first cache.

In some embodiments of any of the above apparatus, the first cache is configured to evict a least recently accessed file when the first cache reaches a memory limit; and wherein the second cache is a disk cache comprising a local directory structure updated asynchronously based on a total number of files cached therein or a total disk space used thereby.

In some embodiments of any of the above apparatus, the third logic is communicatively connected to a plurality of data pods, each of the data pods having a respective first-in/first-out cache to store data received, directly or indirectly, form the object storage.

In some embodiments of any of the above apparatus, a total number of data pods in the plurality of data pods is variable in response to changes in workload.

In some embodiments of any of the above apparatus, data in each of the second files are organized in a plurality of row groups, each of the row groups having a corresponding plurality of data columns having stored therein different respective data types, each of the data columns being individually readable by the support apparatus.

In some embodiments of any of the above apparatus, at least two of the first logic, the second logic, and the third logic are implemented by a common computing device.

In some embodiments of any of the above apparatus, at least one of the first logic, the second logic, and the third logic is implemented by a computing device remote from the scientific instrument.

In some embodiments of any of the above apparatus, at least one of the first logic, the second logic, and the third logic is implemented in the scientific instrument.

In some embodiments of any of the above apparatus, the automated processing is configured to cause each of the plurality of second data files to have data of a fixed number of detector scans or output data sequences.

In some embodiments of any of the above apparatus, the plurality of second data files has more or less than hundred files.

According to another example embodiment disclosed above, e.g., in reference to any one or any combination of some or all of FIGS. 1-8, provided is an automated method performed via a computing device for providing scientific instrument support, the method comprising: acquiring a first data file via one or more detectors of a scientific instrument, the first data file including unsegregated data from a plurality of scans or channels of the one or more detectors; applying automated processing to the first data file to generate a corresponding plurality of second data files based on one or more configuration settings, each of the second data files being smaller than the first data file and being named using a file naming convention referencing respective contents of different ones of the second data files, the corresponding plurality of the second data files being stored in an object storage; and processing a data request received from a client device, the data request being for a data portion of the first data file, the processing including providing the data portion back to the client device by accessing one or more of a first memory cache, a second memory cache, and the object storage to obtain a corresponding portion of a corresponding one of the second data files identified based on the file naming convention, the first memory cache and the second memory cache having different respective eviction policies for data loaded thereto from the object storage.

In some embodiments of the above method, the processing comprises accessing the second cache in response to a cache miss for the data portion in the first cache.

In some embodiments of any of the above methods, the processing comprises: querying a deployment database to determine if another service instance has a copy of the corresponding portion of the corresponding one of the second data files; and obtaining a copy of the corresponding one of the second data files from the object storage when no service instance has the copy of the corresponding portion of the corresponding one of the second data files.

Some embodiments provide one or more non-transitory computer readable media having instructions thereon that, when executed by one or more computing devices for providing scientific instrument support, cause the one or more computing devices to perform any of the above methods.

According to yet another example embodiment disclosed above, e.g., in reference to any one or any combination of some or all of FIGS. 1-8, provided is a scientific instrument, comprising: at least one of a mass spectrometer and a chromatography system including one or more detectors; and a computing device configured to: acquire a first data file via the one or more detectors, the first data file including unsegregated data from a plurality of scans or channels of the one or more detectors; apply automated processing to the first data file to generate a corresponding plurality of second data files based on one or more configuration settings, each of the second data files being smaller than the first data file and being named using a file naming convention referencing respective contents of different ones of the second data files, the corresponding plurality of the second data files being stored in an object storage; process a data request received from a client device, the data request being for a data portion of the first data file; and provide the data portion back to the client device by accessing one or more of a first memory cache, a second memory cache, and the object storage to obtain a corresponding portion of a corresponding one of the second data files identified based on the file naming convention, the first memory cache and the second memory cache having different respective eviction policies for data loaded thereto from the object storage.

What is claimed is:

1. A support apparatus for a scientific instrument, the support apparatus comprising:
    first logic configured to acquire a first data file via one or more detectors of the scientific instrument, the first data file including unsegregated data from a plurality of scans or channels of the one or more detectors;
    second logic configured to apply automated processing to the first data file to generate a corresponding plurality of second data files based on one or more configuration settings of the first data file, each of the second data files being smaller than the first data file and being named using a file naming convention referencing respective contents of different ones of the second data files, the corresponding plurality of the second data files being stored in an object storage; and
    third logic configured to process a data request received from a client device, the data request being for a data portion of the first data file, the third logic being further configured to provide the data portion back to the client device by accessing one or more of a first memory cache, a second memory cache, and the object storage to obtain a corresponding portion of a corresponding one of the second data files identified based on the file naming convention, the first memory cache and the second memory cache having different respective eviction policies for data loaded thereto from the object storage and the second memory cache comprising a local directory structure.

2. The support apparatus of claim 1, wherein the scientific instrument comprises at least one of a mass spectrometer and a chromatography system.

3. The support apparatus of claim 1, wherein the third logic is configured to access the second cache in response to a cache miss for the data portion in the first cache.

4. The support apparatus of claim 3, wherein the third logic is further configured to query a deployment database to determine if another service instance has a copy of the corresponding portion of the corresponding one of the second data files.

5. The support apparatus of claim 4, wherein the third logic is further configured to obtain a copy of the corresponding one of the second data files from the object storage when no service instance has the copy of the corresponding portion of the corresponding one of the second data files.

6. The support apparatus of claim 1, wherein the second cache is larger than the first cache.

7. The support apparatus of claim 1,
    wherein the first cache is configured to evict a least recently accessed file when the first cache reaches a memory limit; and
    wherein the second cache is a disk cache and is updated asynchronously based on a total number of files cached therein or a total disk space used thereby.

8. The support apparatus of claim 1, wherein the third logic is communicatively connected to a plurality of data pods, each of the data pods having a respective first-in/first-out cache to store data received, directly or indirectly, form the object storage.

9. The support apparatus of claim 8, wherein a total number of data pods in the plurality of data pods is variable in response to changes in workload.

10. The support apparatus of claim 1, wherein data in each of the second files are organized in a plurality of row groups, each of the row groups having a corresponding plurality of data columns having stored therein different respective data types, each of the data columns being individually readable by the support apparatus.

11. The support apparatus of claim 1, wherein at least two of the first logic, the second logic, and the third logic are implemented by a common computing device.

12. The support apparatus of claim 1, wherein at least one of the first logic, the second logic, and the third logic is implemented by a computing device remote from the scientific instrument.

13. The support apparatus of claim 1, wherein at least one of the first logic, the second logic, and the third logic is implemented in the scientific instrument.

14. The support apparatus of claim 1, wherein the automated processing is configured to cause each of the plurality of second data files to have data of a fixed number of detector scans or output data sequences.

15. The support apparatus of claim 1, wherein the plurality of second data files has at least one hundred files.

16. An automated method performed via a computing device for providing scientific instrument support, the method comprising:
    acquiring a first data file via one or more detectors of a scientific instrument, the first data file including unsegregated data from a plurality of scans or channels of the one or more detectors;
    applying automated processing to the first data file to generate a corresponding plurality of second data files based on one or more configuration settings, each of the second data files being smaller than the first data file and being named using a file naming convention referencing respective contents of different ones of the second data files, the corresponding plurality of the second data files being stored in an object storage; and
    processing a data request received from a client device, the data request being for a data portion of the first data file, the processing including providing the data portion back to the client device by accessing one or more of a first memory cache, a second memory cache, and the object storage to obtain a corresponding portion of a corresponding one of the second data files identified based on the file naming convention, the first memory cache having a first eviction policy for deleting data from the first memory cache loaded to the first memory cache from the object storage and the second memory cache having a second eviction policy for deleting data from the second memory cache loaded to the second memory cache from the object storage, wherein the first eviction policy and the second eviction policy are different.

17. The automated method of claim 16, wherein the processing comprises accessing the second cache in response to a cache miss for the data portion in the first cache.

18. The automated method of claim 17, wherein the processing comprises:
querying a deployment database to determine if another service instance has a copy of the corresponding portion of the corresponding one of the second data files; and
obtaining a copy of the corresponding one of the second data files from the object storage when no service instance has the copy of the corresponding portion of the corresponding one of the second data files.

19. One or more non-transitory computer readable media having instructions thereon that, when executed by one or more computing devices for providing scientific instrument support, cause the one or more computing devices to perform the automated method of claim 16.

20. A scientific instrument, comprising:
at least one of a mass spectrometer and a chromatography system including one or more detectors; and
a computing device configured to:
acquire a first data file via the one or more detectors, the first data file including unsegregated data from a plurality of scans or channels of the one or more detectors;
apply automated processing to the first data file to generate a corresponding plurality of second data files based on one or more configuration settings, each of the second data files being smaller than the first data file and being named using a file naming convention referencing respective contents of different ones of the second data files, the corresponding plurality of the second data files being stored in an object storage, the file naming convention generating a filename for each of the second data files, each filename identifying the first data file and at least one selected from a group consisting of one or more rows of data from the first data file included in the second data file and one or more columns of data from the first data file included in the second data file;
process a data request received from a client device, the data request being for a data portion of the first data file; and
provide the data portion back to the client device by accessing one or more of a first memory cache, a second memory cache, and the object storage to obtain a corresponding portion of a corresponding one of the second data files identified by a filename of the one of the second data files defined based on the file naming convention, the first memory cache and the second memory cache having different respective eviction policies for data loaded thereto from the object storage.

* * * * *

UNITED STATES PATENT AND TRADEMARK OFFICE
CERTIFICATE OF CORRECTION

PATENT NO. : 12,182,073 B2
APPLICATION NO. : 18/148248
DATED : December 31, 2024
INVENTOR(S) : Neal Borelli Page 1 of 1

It is certified that error appears in the above-identified patent and that said Letters Patent is hereby corrected as shown below:

In the Claims

Column 20, Claim 8, Line 7:
Replace "form" with --from--.

Signed and Sealed this
Eighteenth Day of March, 2025

Coke Morgan Stewart
*Acting Director of the United States Patent and Trademark Office*